July 14, 1959  F. BRILLI  2,894,792
POROUS LUBRICANT-IMPREGNATED BEARINGS
Filed Feb. 21, 1955
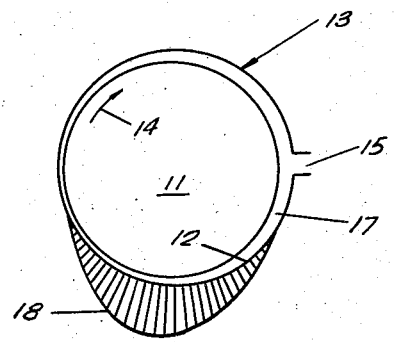
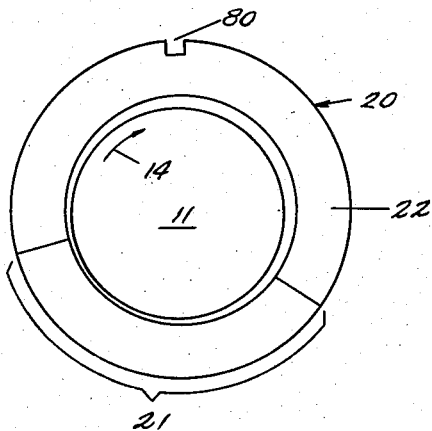
INVENTOR.
FRANZ BRILLI
BY
*Greene, Pinelee & Durr*
ATTORNEYS Уnited States Patent Office
2,894,792
Patented July 14, 1959

2,894,792

POROUS LUBRICANT-IMPREGNATED BEARINGS

Franz Brilli, Vienna, Austria, assignor to Schwarzkopf Development Corporation, a corporation of Maryland Application February 21, 1955, Serial No. 489,565

Claims priority, application Austria February 23, 1954

4 Claims. (Cl. 308—240)

This invention relates to bearings and more particularly to porous bearings, the pores of which are filled with a liquid lubricating medium, such as lubricating oil, for providing a film of the lubricant to the bearing surfaces which support and hold in position the rotating shaft of an associated rotary structure.

Such oil impregnated porous metal bearings have found wide acceptance. However, difficulties are encountered if such bearings are used with shafts operating with a high velocity and/or exerting on the bearing a relatively high pressure. These difficulties are caused by the fact that under high pressures developed at high shaft speeds, the oil of the film underlying the rotating shaft escapes into the pores of the bearing body leaving the shaft without the required interposed lubricating oil film.

Among the objects of the invention are porous oil impregnated bearings for rotary shafts which are able to maintain the required lubricating oil wedge of the liquid lubricant between the rotating shaft and the underlying bearing surface under severe conditions in which heretofore known bearings could not maintain such lubricating wedge.

The foregoing and other objects of the invention will be best understood from the following description of exemplifications thereof, reference being had to the accompanying drawings, wherein Fig. 1 is an explanatory diagrammatic view of the relationship between a rotating shaft and an oil lubricated solid bearing supporting the shaft; and Fig. 2 is a partially diagrammatic end view of a rotating shaft and an associated bearing exemplifying one form of the invention, with some of the dimensions exaggerated for the sake of clarity.

Oil or liquid-lubricant impregnated porous bearings are usually made by first compacting a body of metal powder in a suitable die into desired shaped porous bearing body which is thereafter sintered at elevated temperature. The pores of the sintered bearing member are thereafter impregnated or filled with the liquid lubricant such as lubricating oil, whereupon the bore of the bearing is given the proper calibrated dimension by a suitable finishing operation.

Such oil impregnated porous metal bearings have found wide acceptance and large quantities of such bearings are used in a variety of applications which do not require relatively high speeds.

However, difficulties are encountered when using such oil impregnated porous bearings for shafts operating at high velocities and/or exerting on the bearing surface relatively high pressure because under such conditions the porous bearing cannot maintain the required lubricating film between the rotating shaft and the underlying metal particles of the bearing surface. These conditions will be explained by reference to Fig. 1 showing diagrammatically a shaft 11 of an associated rotary body rotating on a bearing surface 12 of a bearing member 13 of solid metal. The shaft 11 rotates in clockwise direction of the arrow 14. A liquid lubricant is supplied to the bearing surface 12 through bearing opening or slit 15.

The rotating shaft 11 feeds and presses an interposed oil or lubricant wedge 17 between the shaft surface and the underlying bearing surface 12 of the bearing, which interposed lubricant wedge 17 lifts the rotating shaft 11 from the underlying bearing surface 12. As a result, the rotating shaft may be considering as floating on an oil film thereby limiting the friction to pure liquid-metal friction. The proper or required carrying capacity of such oil wedge 17 is however, assured only if the oil in the oil wedge is maintained under the required high pressure. In Fig. 1, the radial lines of the shaded area 18 adjoining the bearing surface 12 indicate a typical distribution of the oil pressure in an oil wedge of a solid bearing on which a shaft 11 rotates in the manner indicated therein.

In case of an oil impregnated porous metal bearing, a shaft rotating at high velocity is not able to develop an oil wedge because oil escaping into the pores of the bearing makes it impossible to develop the high oil pressure required for such oil wedge. As a result, such porous oil impregnated metal bearings are unsatisfactory when used for shafts rotating at high speed.

According to the invention, the difficulties encountered with oil impregnated porous metal bearings with shafts rotating at high speed are overcome and satisfactory operation of such bearings is secured by forming the part of said porous bearing body along which the required high oil pressure should be developed with a lower degree of porosity or lubricant permeability than the other parts of the oil impregnated porous bearing body so that a rotating shaft will be able to develop the high oil pressure along the segment of the bearing along which an oil wedge is to be formed while providing an ample supply of oil at the other bearing parts. The bearing segment along which the oil wedge is to be formed may be formed without any pores or with a smaller number of pores or with smaller sized pores or with a combination of one or more of these features for assuring that the rotating shaft moving at high velocity will develop along such underlying bearing segment an oil pressure such as indicated by the shaded region 18 of Fig. 1.

Porous oil impregnated bearings of the invention having a bearing segment of low lubricant permeability may be formed in a variety of ways. In one arrangement the entire body of the bearing is formed with the same porosity and the segment of the bearing along which the oil wedge is to be formed is filled or infiltrated with low melting material. The low melting infiltrant or filler for such bearing segment may be formed either of low melting metals or of the known synthetic resin material. Good results are obtained by filling the pores of the low-permeability segment with any of the known low melting bearing metals. Alternatively the bearing segment of such porous bearing along which the oil wedge is to be formed is sprayed with a coating of such low melting metal which suppresses flow of oil from an oil wedge formed along it into the underlying pores of the bearing body. A porous bearing of the invention having a segment of low oil permeability may also be formed by compacting the metal powder of such segment to a greater density and smaller porosity than the metal powder of the other parts of the bearing, the compacting operation being followed by sintering and oil impregnation.

When such bearing is produced by compacting the metal powder body in a cylindrical die cavity, it may be formed, for example, as follows: One segment of the die cavity is filled with a body of metal powder to a suitably higher level than required for securing at the end of the compacting operation a bearing body of the required high porosity. After first compacting this segment corresponding to a proper intermediate height, the remainder of the die cavity is filled with the metal powder for the other parts of the bearing sleeve, and a further compacting operation gives the body the shape of the desired final bearing sleeve having a bearing segment of low porosity with adjoining bearing body of the required high porosity. Alternatively, a single compacting operation is performed with a proportionately larger volume of metal powder in the low permeability segment and lower volume for the other parts of the bearing to give them the desired low and high porosities, respectively. The so compacted bearing sleeve is then sintered, infiltrated and machined to calibrated dimensions.

Fig. 2 shows diagrammatically one form of a bearing of the invention. A bearing body 20 has a segment 21 of high density, the remaining bearing body 22 being of the required high porosity. The bearing 20 of Fig. 2 may be prepared in any of the ways described above. The bearing segment 21 has such high density as to cause a shaft 11 rotating on its bearing surface to develop an oil wedge with the required high pressure in the manner explained in connection with Fig. 1. The other bearing part 22, pores of which are filled with oil, has such high porosity as to assure proper oil supply to the bearing surface of segment 21 along which the required oil wedge is to be formed. The bearing 20 may be formed by compacting a body of powder particles to the same porosity throughout all bearing segments followed by sintering to give it the required strength. Thereafter, the part of the bearing surface along the segment 21 is infiltered with molten metal of low melting temperature such as an alloy containing 80% tin with an addition of copper and antimony. Alternatively the infiltration of the bearing segment 21 may be performed after partial sintering, the infiltration being followed by further sintering. The so prepared bearing body of the invention is then calibrated by a final shaping operation to give it the desired bearing opening. It is impregnated with the oil either before or after the final calibration.

In Fig. 2, the high density of the bearing segment 21 as shown extends approximately over one third of the periphery of the bearing surface, and it is displaced from the vertical axis of symmetry of the bearing, corresponding to the direction of the rotation of the shaft 11 indicated by arrow 14, in order to provide for the formation of the oil wedge in the manner explained in connection with Fig. 1. However, a bearing of the invention such as shown in Fig. 2 may be provided with a high density bearing segment 21 which is symmetric with respect to the vertical axis to provide the desired oil wedge for rotation of the shaft 11 in either one of two opposite directions. The bearing sleeve 20 is also shown provided along its outer periphery with a setting notch or groove 80 to permit angular adjustment of its high density bearing segment 21, to the right or to the left, so that it occupies the position corresponding to that indicated in Fig. 1 for a shaft rotating either in clockwise direction or in counterclockwise direction. In many cases, it is sufficient to provide a porous bearing of the type shown in Fig. 2 with a high density bearing segment 21 of smaller arcuate width than indicated in Fig. 2, the segment extending only over the part of the bearing periphery along which the highest oil pressure is developed by the oil wedge formed by the rotating shaft.

It will be apparent to all those skilled in the art that the novel principles of the invention disclosed herein in connection with specific exemplifications thereof will suggest various other modifications and applications of the same. It is accordingly desired that in the present invention they shall not be limited to the specific exemplification thereof described herein.

I claim:

1. In a bearing for a rotating shaft, a bearing body of sintered metal particles having a cylindrical bearing surface along which the shaft rotates, said bearing body having pores in at least a major segmental part of the entire length thereof impregnated with a liquid lubricant for supplying a lubricant film to said bearing surface, a segmental surface section of a bearing section of said bearing extending over the entire length of said bearing body being arranged to maintain thereon a compressed lubricant film under high pressure for supporting the rotating shaft on said compressed lubricant film while it separates said shaft from said segmental surface section, at least one segmental region of said bearing body adjoining said bearing section having its pores filled with said lubricant for supplying lubricant to the lubricant film maintained between said segmental surface section and the shaft, said bearing section being of a lower order of porosity than said adjoining segmental region for suppressing escape of liquid lubricant from said compressed lubricant film along the entire length of said bearing section.

2. In a bearing for a rotating shaft as claimed in claim 1, at least a segmental body portion of said bearing section extending over the entire length of said bearing being impervious to lubricant.

3. In a bearing for a rotating shaft as claimed in claim 1, said bearing having at least two segmental regions adjoining the opposite sides of said bearing section for supplying lubricant to said compressed lubricant film irrespective of the direction of the rotation of the shaft relatively to said bearing.

4. In a bearing for a rotating shaft as claimed in claim 1, at least a segmental body portion of said bearing section extending over the entire length of said bearing being impervious to lubricant, said bearing having at least two segmental regions adjoining the opposite sides of said bearing section for supplying lubricant to said compressed lubricant film irrespective of the direction of the rotation of the shaft relatively to said bearing.

References Cited in the file of this patent

UNITED STATES PATENTS

| | | |
|---|---|---|
| 1,934,355 | Karelitz | Nov. 7, 1933 |
| 2,615,766 | Wallace | Oct. 28, 1952 |
| 2,698,774 | Haller et al. | Jan. 4, 1955 |

FOREIGN PATENTS

| | | |
|---|---|---|
| 664,088 | Great Britain | Jan. 2, 1952 |